United States Patent [19]

Schalles

[11] 3,851,550

[45] Dec. 3, 1974

[54] ADAPTIVE CONTROL SYSTEM FOR PROGRAM-OPERATED MACHINE TOOLS

[75] Inventor: Erhard Schalles, Ubbedissen near Bielefeld, Germany

[73] Assignee: Werkzeugmaschinenfabrik Gildemeister & Comp. Aktiengesellschaft, Bielefeld, Germany

[22] Filed: Sept. 7, 1972

[21] Appl. No.: 287,087

[52] U.S. Cl. .................. 82/2 B, 82/21 B, 318/571
[51] Int. Cl. .......................................... B23b 21/00
[58] Field of Search .............. 82/2 B, 21 B; 318/571

[56] References Cited
UNITED STATES PATENTS

| | | | |
|---|---|---|---|
| 3,122,691 | 2/1964 | Centner et al. | 82/2 B |
| 3,174,367 | 3/1965 | Lukens | 82/2 B |
| 3,449,554 | 6/1969 | Kelling | 82/2 B |
| 3,548,172 | 12/1970 | Centner et al. | 82/2 B |
| 3,671,839 | 6/1972 | Meyer et al. | 318/571 |

*Primary Examiner*—Leonidas Vlachos
*Attorney, Agent, or Firm*—Michael S. Striker

[57] ABSTRACT

An adaptive control system for machine tools wherein a spindle rotates a workpiece and the latter is treated by a tool which is movable in parallelism with and at right angles to the work spindle by discrete variable-speed motors. The control system employs two regulating devices which are connected with the motors by way of a coordinate converter circuit and receive adjusting signals from a torque measuring device for the work spindle, from an RPM measuring device for the work spindle, and from a command unit which can store information pertaining to desired final contour of the workpiece and to desired output. The regulating devices compare the actual output with the desired output and the momentary contour of the workpiece with the desired final contour, and adjust the respective motors so that the geometric sum of movements of the tool in both directions remains constant and that the ratio of movements of the tool in first and second directions is proportional to deviations of the signal indicating the actual output from the signal indicating the desired output.

9 Claims, 12 Drawing Figures

ADAPTIVE CONTROL SYSTEM FOR PROGRAM-OPERATED MACHINE TOOLS

BACKGROUND OF THE INVENTION

The present invention relates to metal working machines in general, and more particularly to improvements in adaptive control systems for program-operated machine tools of the type wherein one or more material removing tools are fed against revolving workpieces. Still more particularly, the invention relates to improvements in turning or like machines wherein the performance of material removing tools is continuously monitored and the information gathered in the course of such monitoring operation is compared with information pertaining to desired performance of the machine.

In accordance with a presently known proposal, the adaptive control system regulates the infeed of the material removing tool between a maximum and a minimum limit. When one of the limits is exceeded, the depth of tool penetration is changed in a direction toward and all the way to the other limit. This is intended to insure an optimum approximation of the maximum output and an optimum rate of material removal. If the rate of tool penetration into the workpiece remains constant, the specific resistance to removal of material remains unchanged at a constant rate of material removal. However, the resistance to penetration (such resistance is measured in kilograms per square millimeter) will vary with changes in the rate of infeed even if the depth of cut and the direction of infeed remain unchanged. As a rule, presently known adaptive control systems regulate the speed at which the tool penetrates into a workpiece. As the speed of penetration per revolution of the workpiece decreases, the specific resistance to penetration rises so that the available motor output is not utilized with a desired degree of efficiency, i.e., to a lesser degree than at a relatively high and constant rate of infeed per revolution of the workpiece. It can be said that conventional adaptive control systems cannot insure the removal of material at a constant rate at an unchanging output of the driving motor because the specific resistance to penetration varies as a function of changes in the thickness of shavings.

SUMMARY OF THE INVENTION

An object of the invention is to provide a novel and improved adaptive control system for turning machines or analogous machine tools which insures that the thickness of shavings and hence the specific resistance which a rotating workpiece offers to penetration of a material removing tool can remain at least substantially constant.

Another object of the invention is to provide an adaptive control system which insures that, when a tool is used to carry out a facing operation and the workpiece is rotated at a constant speed, the specific resistance to penetration and the thickness of shavings can remain constant even though the control system must monitor a relatively small number of parameters, such as the torque which is being applied to the rotating workpiece, the rotational speed of the work spindle, the shape of the cutting tool and/or certain other variable factors which can affect the material removing operation.

A further object of the invention is to provide a control system which regulates the removal of material from a revolving workpiece by full consideration of the geometry of the material removing tool and wherein the consideration of such geometry does not unduly contribute to the complexity of the control system.

An additional object of the invention is to provide a machine tool, such as a lathe, which embodies the improved control system.

The invention is embodied in an adaptive control system for machine tools of the type wherein a work spindle rotates a workpiece which is being treated by a material removing tool and wherein the tool is movable in first and second directions (preferably in parallelism with and at right angles to the axis of the work spindle) at speeds determined by first and second regulatable variable-speed motors. One of the motors may drive a first slide which is movable in the axial direction of the spindle and the other motor may drive a second slide which is mounted on the first slide for movement transversely of the spindle.

The control system comprises first and second adjustable regulating devices each of which is operatively connected with a different one of the two motors and which have sinusoidal or linear characteristic curves one of which is phase-shifted by 90 degrees and trails the other curve. The control system further comprises first and second measuring means which furnish to the regulating devices a first adjusting signal representing the torque which is applied to and the RPM of the workpiece (and thus representing the actual output of the machine tool), and a command unit for furnishing to the regulating devices second and third adjusting signals respectively indicating the desired output and the desired final contour of the workpiece. The regulating devices are arranged to regulate the speed of the motors in response to the adjusting signals so that the geometric sum of movements of the tool in the first and second directions is constant and that the ratio of movements in the first and second directions (and hence the direction of actual movement of the tool) is always proportional to deviation of the first signal from the second signal. During treatment of a workpice, the actual contour at each stage of treatment is compared with the desired final contour of the workpiece.

The control system further comprises first and second measuring means which furnish to the regulating devices first and second adjusting signals respectively indicating the torque which is applied to and the RPM of the work spindle, and a command unit which transmits to the regulating devices third and fourth adjusting signals respectively indicating the value of the aforementioned sum and the desired final contour of the workpiece.

The regulating device whose characteristic curve trails the other characteristic curve is preferably connected with the second motor. The adjustments of the regulating devices in response to first and second signals are proportional to the deviation of first and second signals from predetermined signals. While a workpiece is being treated by the tool, the momentary configuration of the workpiece is continuously compared with the desired final contour of the workpiece. The momentary adjustments of the regulating devices are proportional to the deviation of the continuously measured actual output from a desired output.

The novel features which are considered as characteristic of the invention are set forth in particular in the appended claims. The improved control system itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
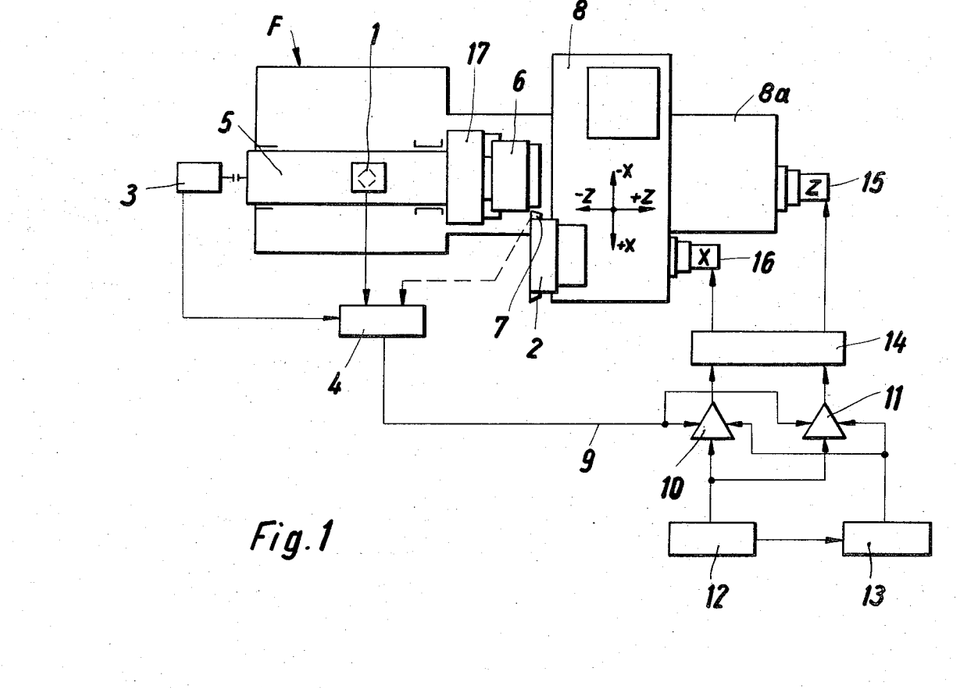
FIG. 1 is a schematic plan view of a single-spindle turning machine and a diagrammatic view of an adaptive control system which embodies one form of the invention.

Referring first to FIG. 1, there is shown a portion of a turning machine having a work spindle 5 which is provided with a chuck 17 or analogous retaining means for a workpiece 6. The work spindle 5 is rotatably mounted in a machine frame F which further supports a main slide or carriage 8a and a cross slide or carriage 8 which latter is mounted on and shares the movements of the main slide 8a. The main slide 8a can be moved axially of the spindle 5 (see the arrows +z and −z) by a regulatable variable-speed motor 15, and the cross slide 8 can be moved relative to the main slide and transversely of the work spindle 5 (see the arrows +x and −x) by a second regulatable variable-speed motor 16.

A torque measuring device 1 produces first adjusting signals which are indicative of the torque applied to the work spindle 5, and an RPM measuring device 3 produces second adjusting signals which indicate the rotational speed of the work spindle. Such signals are transmitted to the respective inputs of a signal multiplying circuit 4. In addition to, or as a substitute for the torque measuring device 1, the machine may be provided with a further measuring device 2 which produces signals indicating the force acting between the workpiece 6 and a material removing tool 7. In machines wherein the material removing means can move in more than two directions, there may be provided one or more additional measuring devices for a second tool. Reference may be had to the copending application Ser. No. 84,856, filed Oct. 28, 1970 by Ledergerber et al. now U.S. Pat. No. 3,715,938, which describes that a first tool can be mounted on a first cross slide which is movable in two directions, and that a second tool can be mounted on a second cross slide which is also movable in two directions. The signal which is furnished by the measuring device 2 at one tool holder is added to the signal furnished by a similar or analogous measuring device at the other tool holder, and the resulting signal can be used as a reference value for the permissible torque.

The measuring devices 2 and/or 1, 3 facilitate the determination of the momentary material removing action. The adjusting signal which is indicative of such material removing action is transmitted from the output of the multiplying circuit 4 via conductor means 9 and to the corresponding inputs of two adjustable regulating devices 10 and 11. The regulating devices 10, 11 transmit regulating signals to the variable-speed motors 15, 16 by way of a coordinate converter or translator circuit 14. For example, the circuit 14 can switch the regulating signals coming from the regulating devices 10, 11, depending on the quadrant in which the removal of material takes place. The exact construction of circuits in the regulating devices 10 and 11 forms no part of the present invention; such circuits are known in the art.

The adjusting signal which is furnished to the regulating devices 10 and 11 by way of the conductor means 9 is compared with the adjusting signal furnished by a command unit 12 and indicating the desired material removing action. If the two signals are different, the regulating devices 10, 11 change the speed of the motors 15, 16. The difference is broken up into components in the $x$-directions (motor 16) and $z$-directions (motor 15). In other words, the regulating devices 10, 11 regulate the motors 15, 16 in such a way that the differential signal initiates a movement of the main slide 8a in the direction −z or +z and/or a movement of the cross slide 8 in the direction −x or +x.

Figure 2:
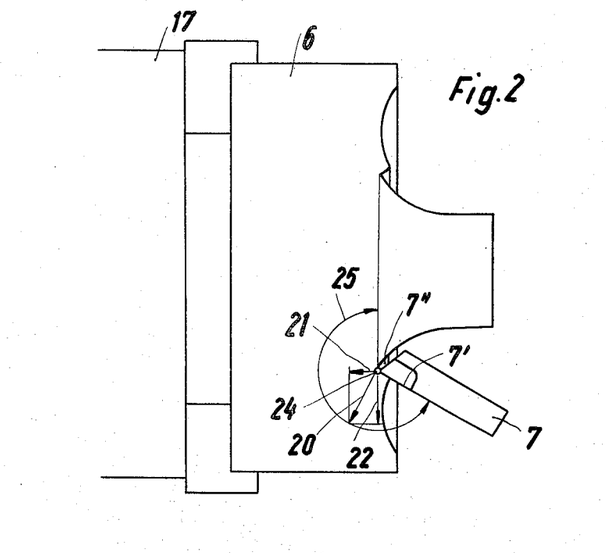
FIG. 2 is an enlarged view of the partially treated workpiece and of the material removing tool in the machine of FIG. 1.
Figure 2A:
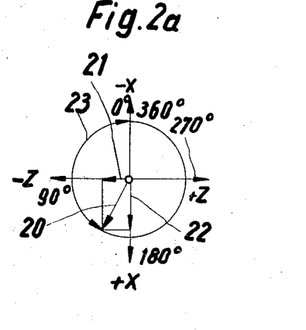
FIG. 2a is a vectorial representation of the rate of feed of the tool during treatment of the workpiece shown in FIG. 2.
Figure 3:
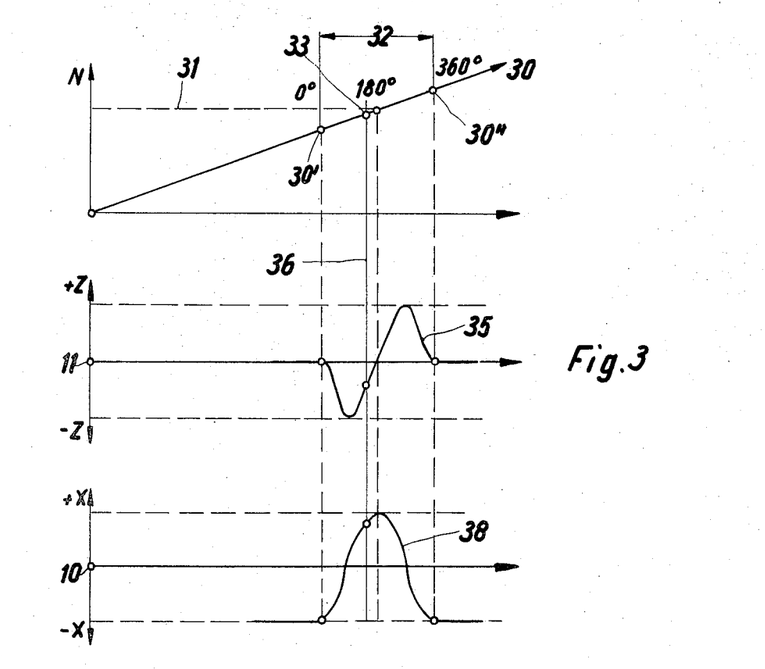
FIG. 3 is a diagram showing the characteristic curves of the regulating devices in the control system of FIG. 1 and a curve representing the output.

Referring to FIGS. 2, 2a and 3, there is shown one mode of adjustment of the tool 7 with reference to the rotating workpiece 6 which is held in the chuck 17 of the work spindle 5. The direction and extent of feed movement of the tool 7 are indicated by the arrow 20. Such direction and extent of movement depend on the input signals to the regulating devices 10, 11 and on the output signal of the command unit 12. The arrow 20 indicates the resultant (geometric sum) of movements in directions −z (arrow 21 and main slide 8a) and +x (arrow 22 and cross slide 8). FIG. 2a shows the extent and the direction of movements represented by arrows 20, 21, 22 in vectorial representation, the angle 23 being the determining factor for the position of the vector 20 and hence for the breaking up of movement of the tool 7 in directions $x$ and $z$.

FIG. 3 illustrates the dependency of the setting of regulating devices 10, 11 on the output error or deviation 33 of the signal 30 which is furnished by the conductor means 9, i.e., on the difference between the signal furnished by the multiplying circuit 4 and the signal from the command unit 12. Only a small range 32 of the signal deviation is used, namely, that between the lower and upper limits 30' and 30''. The range 32 corresponds to the operating range of the regulating devices 10 and 11, i.e., to the values of 0°–360° of the angle 23 shown in FIG. 2a. Thus, as the intensity of signal 30 increases from 30' to 30'', the angle 23 also increases, i.e., there exists (with reference to the lower limit 30') a simple proportional relationship between the deviation from normal operation and the angle 23 and hence the direction of feed of the tool 7.

The signal 30 which is indicative of the momentary output controls the regulating devices 10 and 11. These devices are set up in such a way that, during removal of material from the workpiece 6, the output 31 (signal from the command unit 12) is the desired output. When the output 31 is reached, the starting value of the signal from the z-regulating device 11 is zero, i.e., the main slide 8a is at a standstill. At the same time, the starting value of the signal from the x-regulating device is at a positive maximum, i.e., the slide 8 moves at a maximum speed in the direction +x (radially of and away from the axis of the revolving workpiece 6).

If the value of the signal 30 decreases to zero, the signal at the output of the z-regulating device 11 will arrest the slide 8a and the signal from the x-regulating device 10 will cause the slide 8 to move at a maximum speed in the direction −x. This results in rapid movement of the tool 7 into engagement with the workpiece 6 and the intensity of the signal 30 increases. The setting of the regulating device 10, 11 then remains unchanged until the signal 30 reaches the value 30'. When the signal 30 exceeds the value 30', the output signals furnished by the regulating devices 10 and 11 are changed as follows:

The device 11 changes the rate of movement of the slide 8a in accordance with the equation $$z = -k \cdot \sin(2\pi N_1/N_0).$$

The device 10 changes the rate of movement of the slide 8 in accordance with the equation $$x = -k \cdot \sin(2\pi N_1/N_0) + \pi/2,$$

wherein $N_1$ is the difference between the value of the output signal and the lower threshold value 30', $N_0$ is the difference between the upper limit 30'' and the lower limit 30', and $k$ is the maximum rate of feed.

When the intensity of signal 30 increases from 30' to 30'', the feed in the direction −x decreases and the speed in the direction −z increases. If the intensity of the signal 30 continues to increase, the direction −x is changed to +x and the rate of movement in the x direction increases whereas the rate of movement in the direction z decreases. In response to a further increase in the intensity of signal 30, the direction −z is changed to +z and the rate of movement in the z direction increases whereas the rate of movement in the direction x decreases. In response to a still further increase in the intensity of signal 30, the rate of movement in the direction z decreases and the movement of the slide 8 is changed from +x to −x and the rate of such movement increases. Thus, the speeds of the motors 15 and 16 change sinusoidally. Consequently, even though the direction of movement of the tool changes, the speed of such movement remains constant.

In the machine tool which embodies the structure of FIG. 2, the tool 7 is assumed to be pivotable about the cutting edge 24 at the meeting point of its cutting surfaces 7', 7''. The angle 25 equals the angle 23 + 90° and is indicative of the inclination of the main cutting surface 7'' of the tool 7 with reference to a plane which is normal to the axis of the workpiece 6. The tool 7 turns about the cutting edge 24 in dependence on changes in the position of the vector 20 to remain in an optimum material removing position.

As shown in FIG. 3, the characteristic curves 38, 35 of the regulating devices 10, 11 are of sinusoidal shape. With reference to the lower limit 30' of the range 32 of deviation of the output signal 20 from the signal 31, the curve 35 begins, with the feed ratio 0 and is limited by the values +z and −z. The values +z and −z correspond to the predetermined rate of feed.

The curve 38 of the regulating device 10 has a phase shift of 90° with respect to the curve 35 (the curve 35 trails the curve 38). Thus, the initial feed rate 0 of the regulating device 11 coincides in time with the maximum initial feed rate (−x) of the regulating device 10. The regulation progresses in accordance with the x- and z-ratios of the vectorial representation of FIG. 2a, it being assumed that the feed vector turns in in a counterclockwise direction. The values of the illustrated vectorial example correspond to those on the line 36 shown in FIG. 3. In this example the thickness of shavings and the feed are constant in all vectorial positions.

The coordinate converter circuit 14 of FIG. 1 is a quadrant switching means which determines the working area and hence the direction of movement of the slides 8 and 8a. In the example of FIG. 2, the converter circuit 14 causes the tool 7 to advance in the directions −z and +x. The converter circuit 14 may be provided with means for manual feeding of information or it may form part of a perforated strip. In a fully automatic machine, the converter circuit 14 may form part of the control means which monitors the absolute direction of feed of the tool 7 and, when the tool reaches the boundary of a first quadrant, automatically switches over to the next-following quadrant.

Referring again to FIGS. 2 and 2a, the quadrant containing the vector 20 is bounded by the arrows −z and +x. The next quadrant is bounded by the arrows +x and +z, and so forth. Such division of the working area into quadrants is customary in control systems of the type to which the present invention pertains as well as in certain related control systems, such as hydraulic copying systems. The position of various quadrants is normally determined by suitable switches and the reliance on such quadrants facilitates a determination of the direction of feed of a material removing tool.

The tool 7 is mounted on the slide 8 by way of a suitable tool holder, not shown. The direction of movement of the slide 8 corresponds to a circular path about the cutting edge 24 of the tool 7 and the slide 8 has guides which are of arcuate shape and have their centers of curvature located on the cutting edge 24 of the tool. When the slide 8 is moved, the shank of the tool 7 travels along the arcuate path defined by the line denoting the angle 25 of FIG. 2. Consequently, in the embodiment of FIG. 2, the shank of the tool 7 retains its radial position relative to the pivot axis so that the cutting edge 24 coincides with such axis. If the angular movement of the slide 8 is controlled by regulating devices 10, 11, it is possible to maintain the main surface 7' of the tool 7 at a right angle to the direction of feed movement (in FIG. 2, the surface 7' is normal to the vector 20) to thus insure the establishment of optimum cutting conditions during removal of material from the workpiece.

Figure 4:
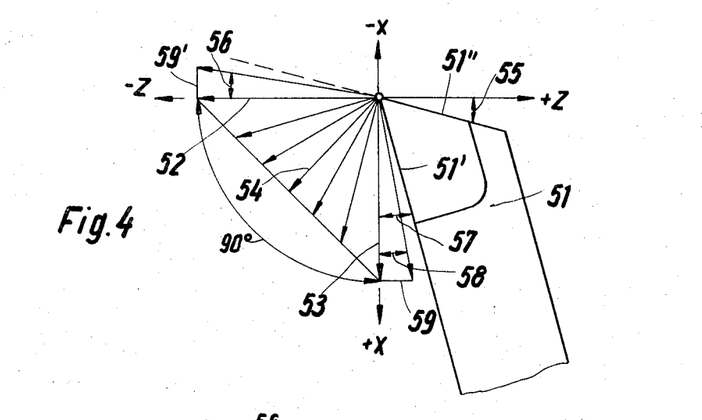
FIG. 4 is a vectorial representation of the rate of feed in a machine which is combined with a modified control system.
Figure 5:
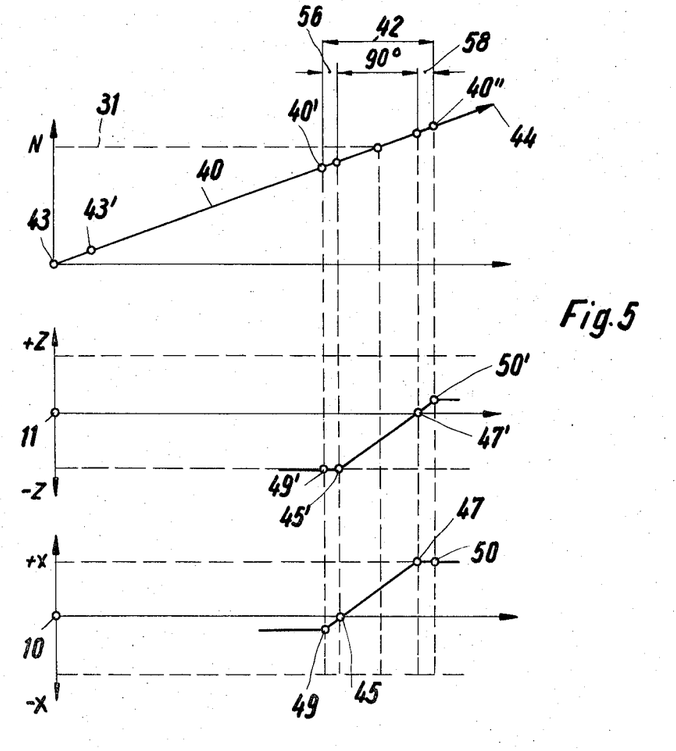
FIG. 5 is a diagram showing the characteristic curves of the regulating devices in the modified control system and a curve representing the output.

Another construction of the regulating devices 10 and 11 especially for use in turning machines, is shown schematically in FIGS. 4 and 5. The reference character 51 denotes a turning tool which, in accordance with the prevailing practice, is assumed to be rigidly mounted in its holder and on the corresponding slide. In such machines, the range of regulating devices 10 and 11 may be reduced to less than 360° (compare with FIG. 3 wherein the range of the regulating devices 10, 11 is 360°). The range can be reduced to one quadrant of the vectorial respresentation according to FIG. 2a plus the acute angles 56, 58 shown in FIG. 4. The angles 56, 58 are smaller than, and their magnitude is a function of, the angle 55 between the auxiliary cutting surface 51" of the tool 51 and the direction z as well as the angle 57 between the main cutting surface 51' and the direction x. For the sake of simplicity, the characteristic curves of the regulating devices 10, 11 are shown as straight lines which results in a change of feed from the value 52, through the value 54 and to the value 53.

FIG. 5 illustrates the mode of operation of regulating devices 10, 11 in accordance with the vectorial representation of FIG. 4. The reference character 42 denotes the narrow range of deviation of the signal 40 (this signal is proportional to the output) from the signal 31 (command unit 12). The range 42 is used for regulation and extends between the limits 40' and 40''; it corresponds to the 90° angle of the quadrant plus the angles 56 and 58 of FIG. 4. The regulating action of the devices 11 and 10 changes linearly between the points 45', 47' and 45, 47. Within the angle 56, the regulating device 11 furnishes an unchanging output signal (see the points 49' and 45'). The ratio of feed in the direction −z then corresponds to the predetermined maximum feed. At the same time the regulating device 10 follows its predetermined regulating course between the points 49 and 45. The operation of regulating devices 10, 11 is reversed for the angle 58. Thus, the +x ratio between the points 47 and 50 remains unchanged whereas the regulating device 11 follows its predetermined regulating course between the points 47' and 50'.

In the regions 43, 40' and 40'', 44 of the signal 40, the regulating devices 10, 11 operate without their predetermined ranges. These regions are used for rapid transport of the tool 51. In the region between the points 43 and 40', the tool 51 is rapidly advanced in the direction −z to avoid losses in time during initial penetration into the workpiece. In the region between the points 40'' and 44, the tool 51 is rapidly advanced in the direction +x to avoid breakage of tool due to accumulation of material which has been removed from the workpiece.

In order to enable the machine to remove, with suitable tools and in a simple manner, material from the interior of a revolving workpiece or during rearward transport. The signals from regulating devices 10, 11 are transmitted to the motors 15, 16 by way of the coordinate converter circuit 14 of FIG. 1. The circuit 14 can select the transmission of signals to the motors 15, 16 in dependency on the desired course of treatment or it changes the sign of the direction of feed from positive to negative or vice versa.

It will be noted that, whereas the regulating devices 10, 11 of FIG. 3 can regulate the feed within the full range from +z to −z (device 11) and from +x to −x (device 10), the range of the regulating devices 11, 10 of FIG. 5 is restricted substantially to that between −z and zero (device 11) and +x and zero (device 10). FIG. 5 further shows that the zero position can be slightly exceeded (see 47'−50' and 49−45). Between 45 and 49, the regulating device 10 operates within the angle 56. Between 47' and 50', the device 11 operates within the angle 58. The difference between 45 and 49 is the value 59' (FIG. 4) of the speed of infeed in the direction −x. The value 59', together with the speed in the direction −z (vector 52 of FIG. 4) as determined by the output signal 49' of the regulating device 11, furnishes the angle 56.

The exceeding of the zero position by the regulating devices in the region 59 is represented by an extension of the characteristic curve of the regulating device 11 beyond the point 47' to the point 50'. The difference between 47' and 50' corresponds to the value 59 (FIG. 4) of the feed rate in direction +z. This value, together with the speed 53 in the direction +x (given by the output signal 50 of the regulating device 10) furnishes the angle 58.

As mentioned above, the characteristic curves of regulating devices 10, 11 shown in FIG. 5 are straight lines. The thus obtained reduction in the speed of feed (see 54 in FIG. 4), as compared with the value 52 resp. 53, is negligible.

As long as the magnitude of signal 40 is below the lower limit 40', the output signal of the regulating device 11 is at a negative maximum and the output signal of the regulating device 10 has a low −x value so that the tool 51 is then advanced at the angle 56.

When the intensity of signal 40 increases from 40' to 40'', the starting values of the signals from regulating devices 10, 11 change linearly in such a way that, when the signal 40 reaches the value 40'', the regulating device 11 furnishes a weak +z signal and the output signal from the regulating device 10 reaches its maximum negative value. Consequently, the tool 51 is moved at the angle 58.

The command unit 12 can comprise a control panel for manual feeding of data. Alternately, the command unit 12 may comprise an automatic reader for punch cards with a digital device for storage of desired data. One of such data may include the desired speed of feed movement of the tool (see the vector 20 in FIGS. 2 and 2a). Another of such data can represent the angle 57 of the surface 51' on the tool 51 of FIG. 4, and still another of such data can represent the angle 55 of the surface 51'' of the tool 51.

Figure 6:
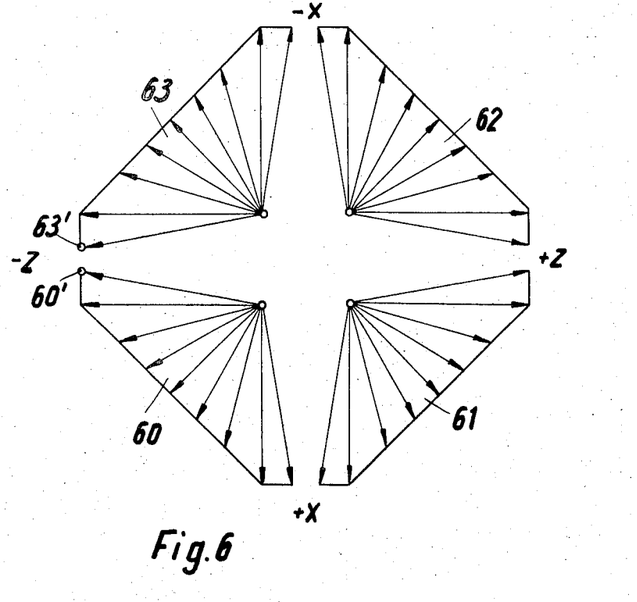
FIG. 6 is a vectorial representation of the effects of a quadrant switch.

FIG. 6 illustrates the effect of the coordinate converter circuit 14. The sector 60 (covering an angle of 90° plus 56 and 58 is rotated and/or folded in such a way that it can alternately assume the effective positions 61, 62 and 63. For example, the sector 60 has a minimum signal at 60' which corresponds to a minimum output (see the point 40' in FIGS. 5) and is suited for treatment of the exterior of a workpiece. The sector 63 is preferably selected for internal treatment whereby the point 63' corresponds to the point 60'.

Figure 7:
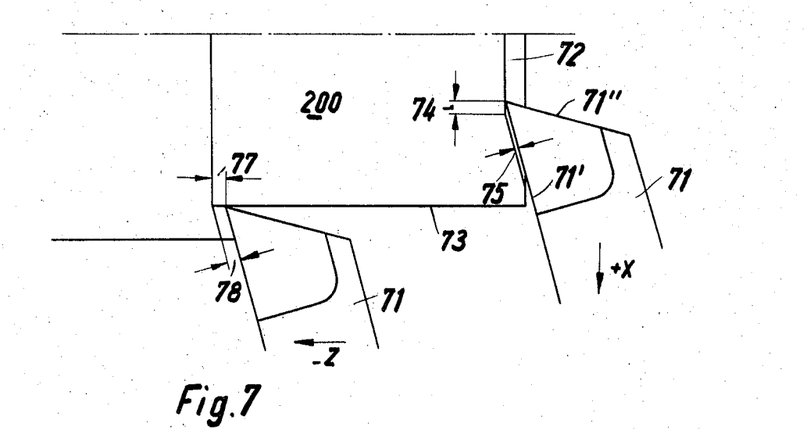
FIG. 7 illustrates the adverse effects of unchanged orientation of the tool upon the thickness of shavings during treatment of a workpiece.

FIG. 7 illustrates an example of external treatment and the undesirable influence of unchanged orientations of a tool 71 and the geometry of its cutting surfaces 71', 71'' upon the thickness of shavings. During turning of the end face 72 of the workpiece 200 (while the tool 71 is fed in the direction +x) and during turning of the surface 73 (while the tool 71 moves in the direction +z), the feed rates 74(+x) and 77 (−z) are equal (see FIG. 4). The thickness of shavings 75 is much less than the thickness of shavings 78; the ratio of such thicknesses equals the ratio of sine to cosine of the angle between the cutting surfaces 71', 71'' the tool 71. In order to eliminate such drawback, i.e., to insure that the thickness of shavings 75 will equal that of the shavings 78, the feed (see 49 in FIG. 5) with reference to the +x axis must be increased by the factor minus cotangent of the angle between the surfaces 71' and 71'' of the tool 71. The limit of the operating range of the regulating device 10 (+x) is changed or corrected to 84 (see FIG. 8). Due to such correction, the +z value 59 changes proportionally (see FIG. 4).

In order to change the limits 52 and 53 and the extensions 59 and 59' of the basic regulating device design of FIG. 4 in a manner as described in connection with FIG. 8, the command unit 12 of FIG. 1 should transmit to the devices 10, 11 signals which, in addition to indicating the desired feed rate, further represent the angles of inclination of cutting surfaces on the tool or corresponding data pertaining to the geometry of the tool. This is achieved by the provision of a circuit 13 which is shown in FIG. 1 and forms part of a digital control system and serves to relate the desired rate of feed with the angles of cutting surfaces on the tool. Thus, the circuit 13 is a correcting circuit which corrects the speeds of the motors 15 and 16 with a view to account for the design of the cutting portion of the tool and to thus insure that the thickness of shavings 75 shown in FIG. 7 equals the thickness of shavings 78.

Figure 9:
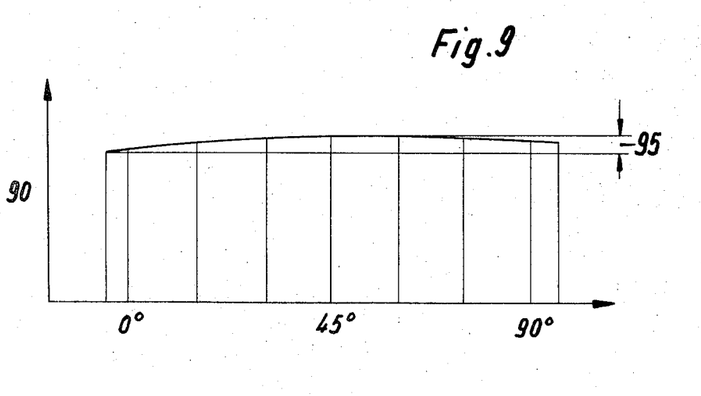
FIG. 9 is a diagram showing changes in the thickness of shavings during treatment of a workpiece with a tool which is controlled in a manner as shown in FIG. 8.

FIG. 9 is a diagram wherein the thickness 90 of shavings is measured along the ordinate and wherein the range of the regulating devices 10, 11 is measured along the abscissa. It will be seen that the thickness of shavings is substantially constant along the entire regulating range (90°) and that the simplification of regulation (i.e., that the characteristic curves of the regulating devices 10, 11 shown in FIG. 5 are straight lines) results in a minor deviation (shown at 95) from the constant thickness of shavings.

Figure 10:
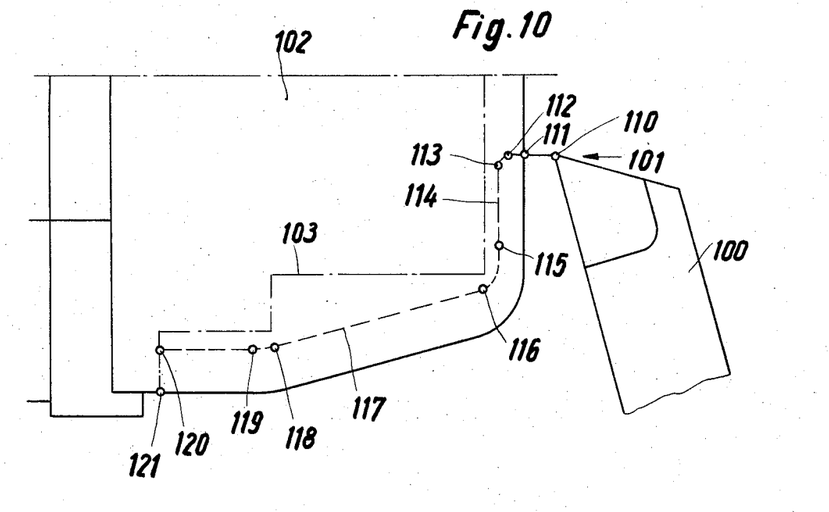
FIG. 10 illustrates an example of external treatment of a workpiece.
Figure 11:
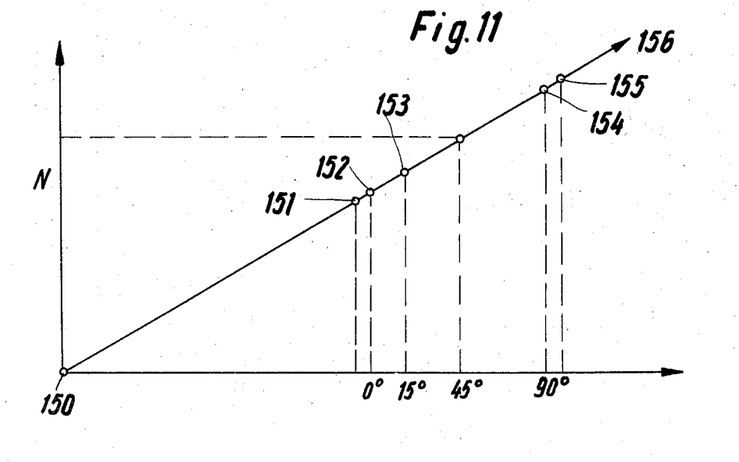
FIG. 11 illustrates the output-proportional signal during treatment of the workpiece shown in FIG. 10.

FIG. 10 illustrates the mode of operation of the improved control system (and FIG. 11 shows the corresponding output signal 156 during correspondence of the regulating process according to the vectorial representation of FIG. 8) during treatment of the external surfaces of a workpiece 102. In the starting position 110 of the cutting edge on the tool 100, the signal has the value 150 which is outside of the regulating range between the limits 151 and 155. The tool 100 moves in the direction 101 to advance rapidly toward engagement with the workpiece 102. During the initial penetration (between 111 and 112 in FIG. 10), the intensity of the signal represented by the inclined line of FIG. 11 increases and reaches the lower limit of the regulating range at the point 151 (see the vector 83 of FIG. 8). From there on, the direction and extent of movement of the tool 100 are such as represented by the vector 82 of FIG. 8.

Figure 8:
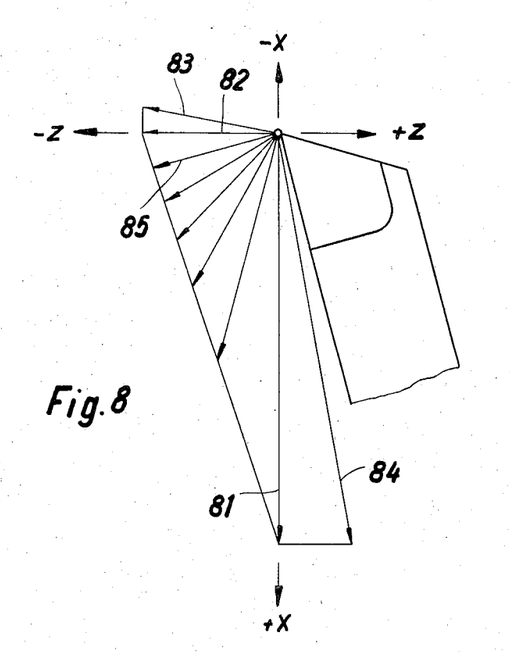
FIG. 8 is a similar diagram showing the effects of changing orientation of the tool.

As the tool 100 continues to penetrate into the material of the workpiece 102, the intensity of the signal increases beyond the values 152, 153 while the regulators rotate the vector 83 (and thus change the direction of feed) in a counterclockwise direction, as viewed in FIG. 8. The tool 100 moves from the point 112 toward the point 113 of FIG. 10. At the point 113 (see 154 in FIG. 11), the rate of shaving removal ceases to increase and the vector representing the feed then corresponds to that shown at 81 in FIG. 8 of the drawing. The tool 100 then advances in the direction +x.

Between the points 115 and 116, the intensity of the signal decreases from 154 to 153 and the vector has been rotated to the position 85 of FIG. 8. From there on, the output remains unchanged while the cutting edge of the tool 100 provides the workpiece 102 with a conical surface 117. The intensity of signal thereupon decreases from 153 to 152 and the vector rotates while the cutting edge moves between the points 118 and 119 of FIG. 10. The new angular position of the vector is shown at 82 of FIG. 8. The angular position of the vector remains unchanged while the cutting edge of the tool 100 travels between the points 119 and 120 of FIG. 10. During the next stage of treatment, the tool 100 is moved away from the workpiece 102 and can be moved to a new starting position if the machine is designed to remove material in several successive passes. For example, the tool 100 can treat the workpiece 102 in two successive passes the first of which results in removal of material to the broken line 114 of FIG. 10 and the second of which results in removal of material to the phantom line 103 (final contour plus such material which is to be removed during aftertreatment (such as lapping or polishing). During those stages of the movement of the tool 100 when the cutting edge moves along surface portions which were found during the preceding pass (see, for example, the workpiece portion between the points 120 and 121 of FIG. 10), the tool is advanced at an elevated speed.

The adaptive control system of the present invention exhibits a number of important advantages. Thus, the thickness of shaving and hence the rate of material removal per unit of time remain constant. The speed of movement of the tool in the directions $x$ and $z$ depends only on the desired feed and on the automatically determined signal from the multiplying circuit 4. The geometry of the material removing tool can be considered in adjustment of the regulating devices 10, 11 (see the correcting circuit 13 of FIG. 1) in a simple and inexpensive way. During turning at a constant cutting speed, only the extent of the desired feed must be changed (command unit 12) proportionally with the changes in RPM.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore such adaptations should and are intended to be comprehended within the meaning and range of equivalence of the claims.

What is claimed as new and desired to be protected by Letters Patent is set forth in the appended claims:

1. In a machine tool for turning a rotating workpiece by a material removing tool which is movable in first and second directions at rates determined by first and second variable-speed motors, an adaptive control system comprising first and second adjustable regulating devices each operatively connected with a different one of said motors, said devices having characteristic curves one of which is phase-shifted relative to and trails the other curve by 90°; first and second measuring means for furnishing to said regulating devices a first signal indicative of the torque applied to and the RPM of the workpiece and thus representing the actual output of the machine tool; and a command unit for furnishing to said regulating devices second and third adjusting signals respectively indicating the desired output and the desired final contour of the workpiece, said regulating devices being arranged to regulate the speed of said motors in response to said signals so that the geometric sum of movements of said tool in said first and second directions is constant and that the ratio of movements of said tool in said first and second directions, and hence the direction of actual movement of said tool, is proportional to the deviation of said first signal from said second signal.

2. A control system as defined in claim 1, wherein said first direction is parallel with and said second direction is normal to the axis of the workpiece.

3. A control system as defined in claim 1, wherein said characteristic curves are sinusoidal curves.

4. A control system as defined in claim 1, wherein said characteristic curves are straight lines.

5. A control system as defined in claim 4, wherein said tool has two mutually inclined cutting surfaces one of which makes with one of said directions a first acute angle and the other of which makes with the other of said directions a second acute angle, said regulating devices being arranged to regulate said motors within an angle exceeding 90° by two acute angles one of which is smaller than said first angle and the other of which is smaller than said second angle.

6. A control system as defined in claim 1, further comprising coordinate converter means connected between said regulating devices and said motors.

7. A control system as defined in claim 1, further comprising correcting means arranged to supply to said regulating devices signals representing the geometry of said tool and arranged to insure the removal of shavings having a constant thickness.

8. A control system as defined in claim 1, wherein each of said regulating devices has a predetermined regulating range and an operating range exceeding said regulating range, said devices being arranged to effect rapid movements of said tool in the respective directions when operating without said regulating range.

9. A control system as defined in claim 8, wherein said regulating devices are arranged to move the tool toward the workpiece when operating below said regulating range and to move the tool away from the workpiece when operating beyond said regulating range.

* * * * *